May 6, 1958 C. H. LUST 2,833,358
HARVESTING MACHINE FOR ROW GROWN TABLE VEGETABLES
Filed Feb. 28, 1956 4 Sheets-Sheet 1
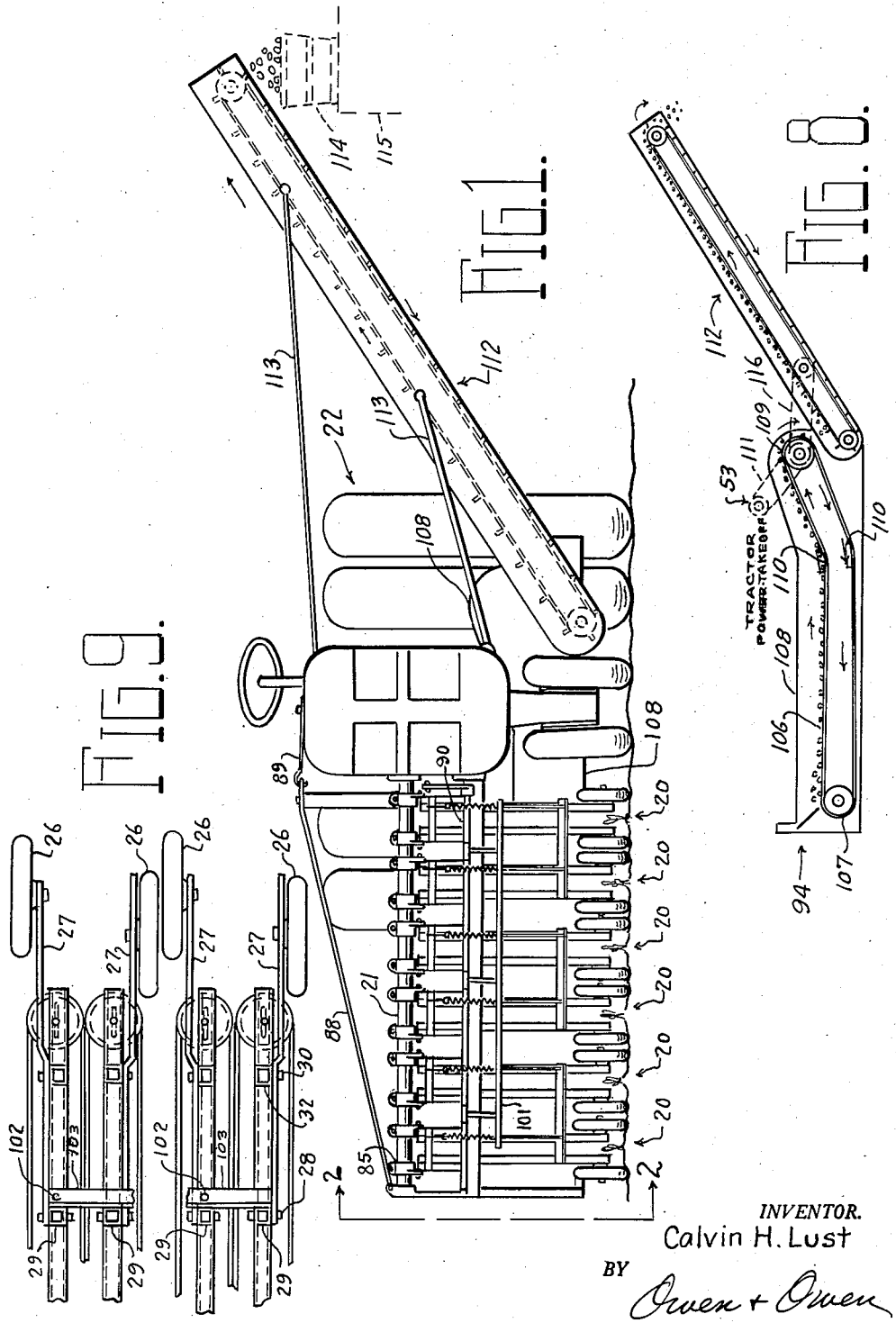
INVENTOR.
Calvin H. Lust
BY
Owen + Owen
ATTORNEYS

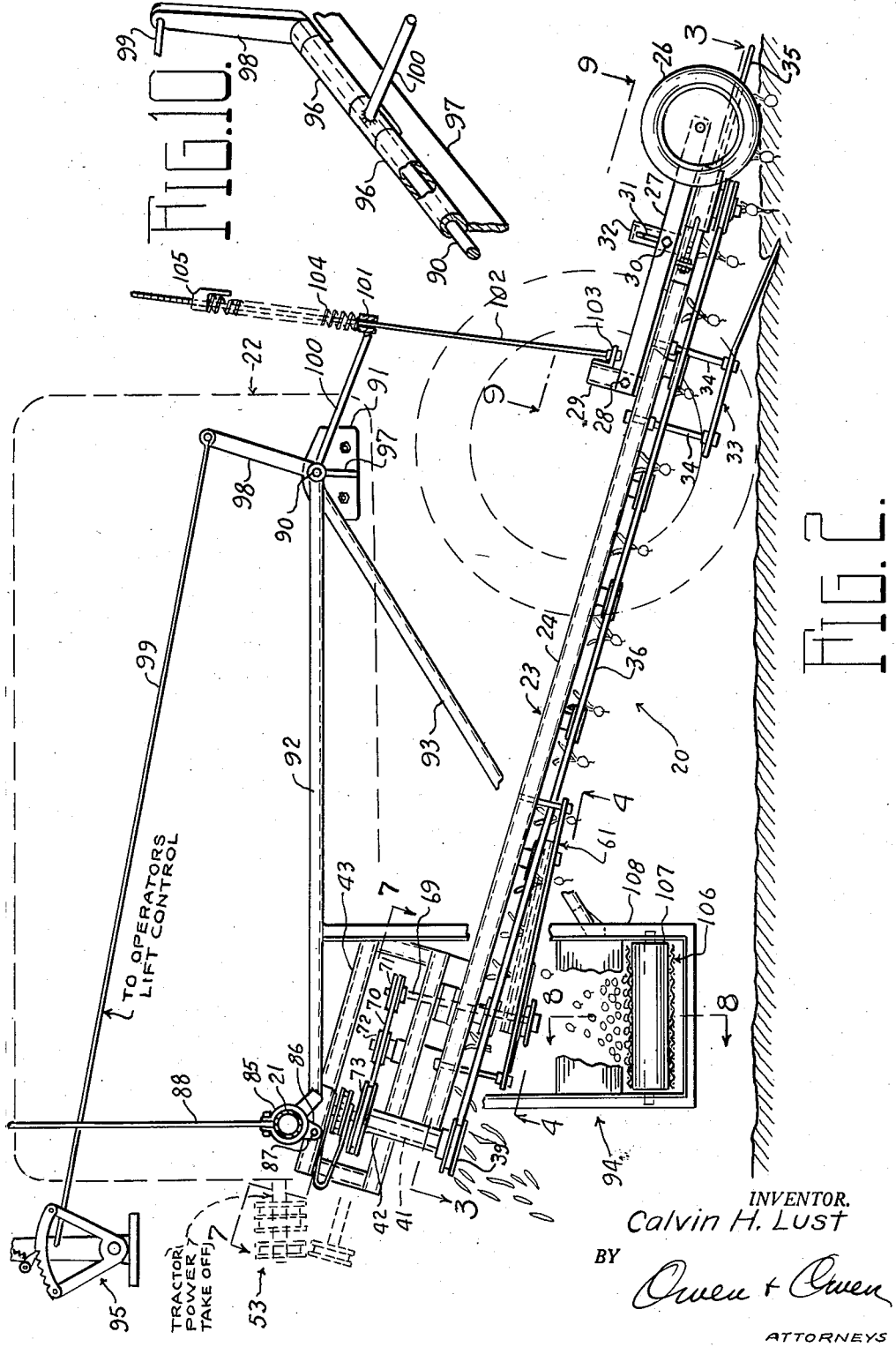

May 6, 1958   C. H. LUST   2,833,358
HARVESTING MACHINE FOR ROW GROWN TABLE VEGETABLES
Filed Feb. 28, 1956   4 Sheets-Sheet 3
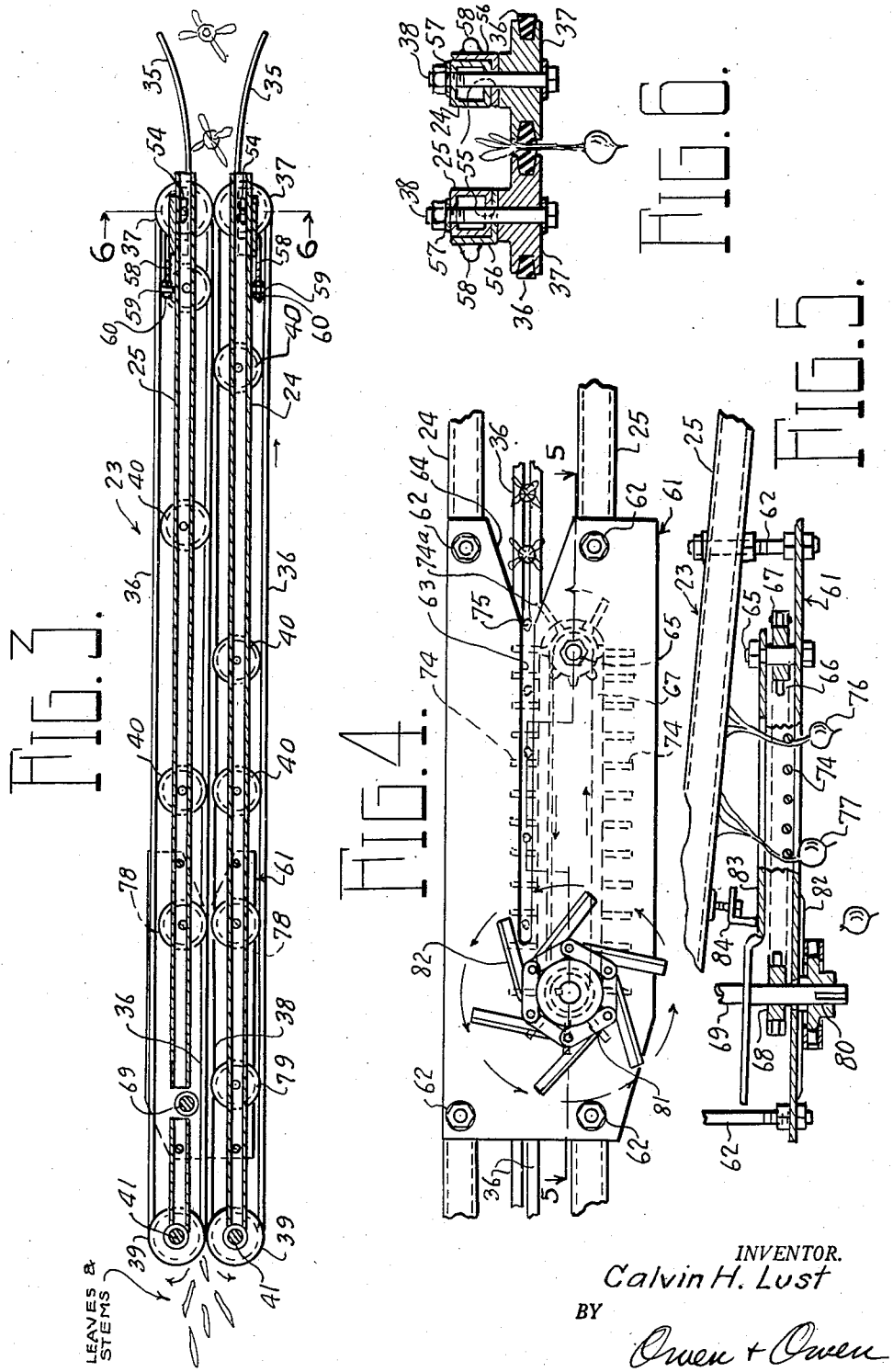
INVENTOR.
Calvin H. Lust
BY
Owen + Owen
ATTORNEYS May 6, 1958 C. H. LUST 2,833,358
HARVESTING MACHINE FOR ROW GROWN TABLE VEGETABLES
Filed Feb. 28, 1956 4 Sheets-Sheet 4
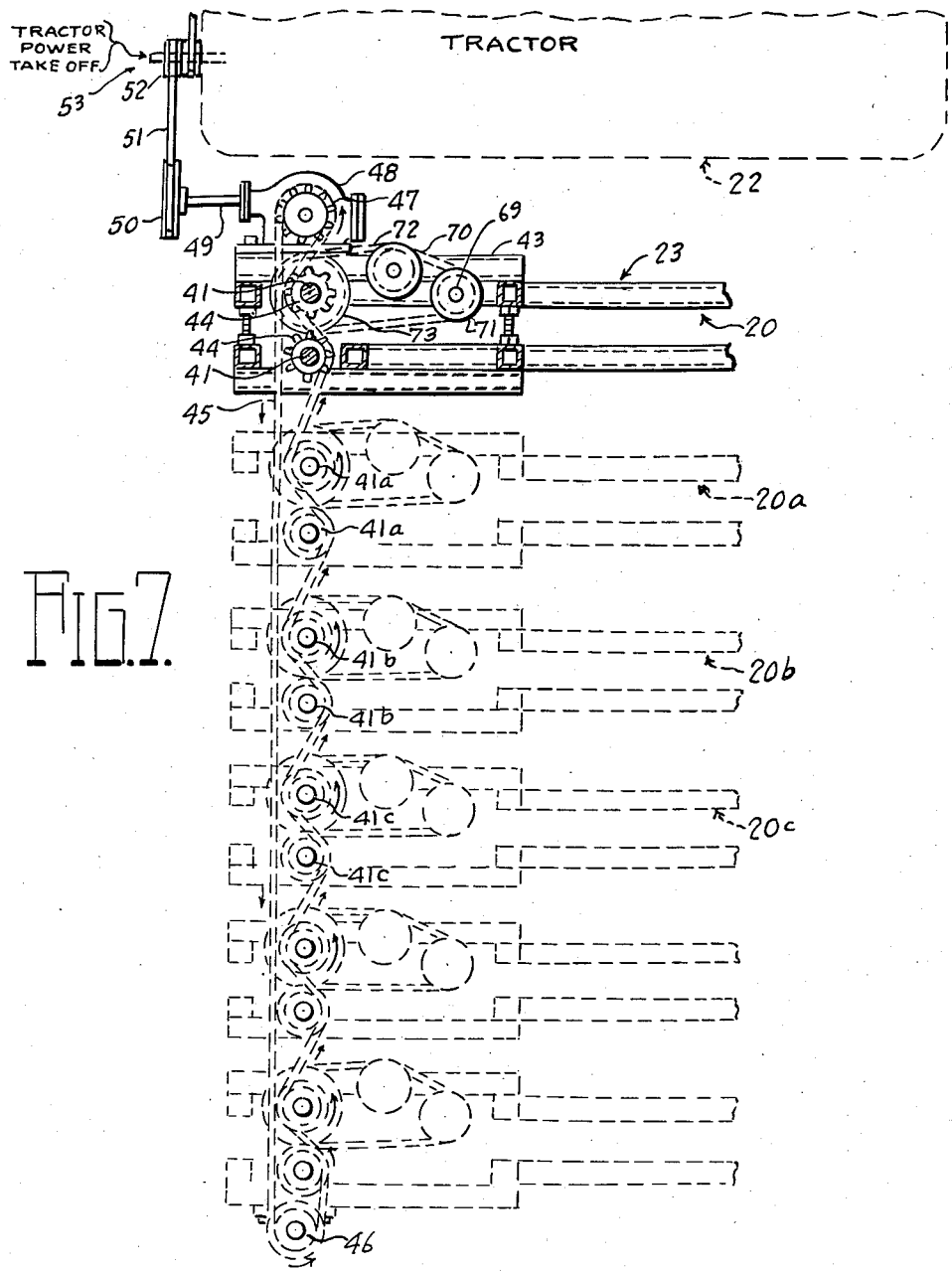
INVENTOR.
Calvin H. Lust
BY
Owen + Owen
ATTORNEYS

United States Patent Office 2,833,358
Patented May 6, 1958

2,833,358

HARVESTING MACHINE FOR ROW GROWN TABLE VEGETABLES

Calvin H. Lust, Chatfield, Ohio

Application February 28, 1956, Serial No. 568,248

5 Claims. (Cl. 171—37)

This invention relates to a machine for automatically digging and topping row crops of table vegetables having body portions which normally grow below ground level, stems extending upwardly above the surface of the ground and leaves on the upper ends of the stems. The machine embodies specific improvements over machines of the art which have been employed, for example, for harvesting sugar beets. These improvements are designed to handle the vegetables with greater care, to cut off their leaves and stems closer to the bodies and at uniform distances therefrom and to avoid bruising the skins of the edible bodies. The embodiment of the invention disclosed is particularly designed to harvest and top table radishes.

Machines having endless conveyors which grasp the tops of sugar beets and feed them up an inclined path leading to severing means are known. These machines can be and are relatively crude in their operation because sugar beets need not be kept in good condition since they are merely conveyed to a factory and ground up. In the case of a table vegetable, however, and particularly in the case of table radishes, the vegetable must be handled with extreme care in order to avoid bruising the tender pink skins. Housewives reject radishes where the skins have been bruised or broken or where the upper portions of the radishes have been cut away by the topping devices.

It is the principal object of this invention, therefore, to provide a machine capable of being driven along a row of growing vegetables which will lift them from the ground, convey them individually and serially to a topping mechanism, gently position the vegetables relative to the topping knife so that the stems will be cleanly severed closely adjacent the bodies and will so handle the vegetables and their bodies that damage to the bodies is eliminated.

A machine embodying the invention also includes mechanisms whereby the vegetable bodies may be accumulated and conveyed, for example, to baskets or other containers carried on an accompanying truck or wagon and it includes mechanisms enabling the operator to adjust its operation to meet varying conditions.

These and more specific objects and advantages will be better understood from the following specification and from the drawings, in which:

Fig. 1 is a front view in elevation showing a group of individual row harvesters embodying the invention as mounted upon a farm type tractor for support and motivation.

Fig. 2 is a fragmentary view in elevation with parts broken away, taken from the position indicated by the line 2—2 of Fig. 1, and shown on an enlarged scale.

Fig. 3 is a horizontal, sectional view taken along the line 3—3 of Fig. 2 and showing, in particular, the crop elevating mechanism.

Fig. 4 is a fragmentary, sectional, bottom view in elevation, and on an enlarged scale, taken from the position indicated by the line 4—4 of Fig. 2 and particularly showing the topping mechanism.

Fig. 5 is a fragmentary, vertical, sectional view taken along the line 5—5 of Fig. 4.

Fig. 6 is a fragmentary, vertical, sectional view on an enlarged scale taken along the line 6—6 of Fig. 3.

Fig. 7 is a generally horizontal, sectional view taken along the line 7—7 of Fig. 2 and illustrating the driving mechanism for a plurality of individual row harvesting devices embodying the invention as mounted upon a driving tractor in the manner illustrated in Fig. 1.

Fig. 8 is a digrammatic view on a smaller scale showing the crop body receiving and conveying mechanisms for carrying the severed crop bodies away from the topping mechanism and for discharging them into suitable receptacles.

Fig. 9 is a fragmentary plan view taken from the position indicated by the line 9—9 of Fig. 2.

Fig. 10 is a fragmentary view in perspective showing a portion of the mechanism for raising the crop digging and lifting portions of a harvester away from harvesting position.

A machine embodying the invention may comprise one or more substantially identical mechanisms each designed to harvest the crop in a single row, to lift the vegetables from the earth, to convey them to topping mechanism, to sever the stems closely adjacent the bodies and to discharge the severed stems and leaves from the rear of the machine onto the surface of the ground. In the embodiment of the inventions shown in the drawings there are six single row harvesters 20 arranged side by side for simultaneously harvesting crops from six parallel neighboring rows. The six harvesters 20 are supported as a group by a main support post 21 (Fig. 1) mounted upon the side of a farm type tractor generally indicated at 22. As will be better understood as the description of the invention continues, each of the harvesters 20 is an independent mechanism, but all of them are supported and carried along the field by the motive power of the tractor 22 and are driven, insofar as their own individual operation is concerned, by a power transmission means driven from the power take-off of the tractor 22.

Each of the harvesters 20 (see Figs. 2 and 3) comprises an elongated downwardly inclined frame 23 consisting of two parallel box girders 24 and 25. Suitable cross frame members (not shown in detail in the drawings) are spaced along the girders 24 and 25 to connect them to each other and to form a rigid, open framework. Each individual harvester frame 23 has a pair of staggered front wheels 26 (see also Fig. 9) which are rotatably mounted on the front ends of adjustable arms 27. Each of the arms 27 is pivotally linked at its rear end to a stud 28 set in a post 29 erected on its respective girder 24 or 25 and each arm 27 may be adjusted angularly relative to its girder 24 or 25 by an adjustment nut 30 extending through the arm 27 and through a slot 31 in a second post 32 similarly erected on the girder 24 or 25 nearer the lower end of the frame 23.

An earth breaker 33 is mounted by struts 34 to the underside of the frame 23 and extends forwardly to a position where, upon movement of the harvester over the ground, it loosens the earth as the harvester proceeds along the row of vegetables. Also mounted at the lower or right end of each harvester frame 23 are a pair of leaf guides 35 which extend down into close proximity to the surface of the ground and sweep up the naturally spreading leaves of the vegetables being harvested.

The guides 35 guide the leaves into the nip between the inner spans of a pair of lifting belts 36 that run on support pulleys 37 located at the lower ends of the frame 23. The pulleys 37 are journalled upon vertical pins 38 extending through the girders 24 and 25 (Fig. 6). The belts 36 also are engaged with driving pulleys 39 at the upper or left end of the frame 23 and with idler support pulleys 40 spaced along the frame 23 each of which is suitably journalled in its own bearing on one or the other of the girders 24 and 25. The driving pulleys 39 are pinned or keyed on the lower ends of a pair of drive shafts 41 (Fig. 2) that are rotatably mounted in journal sleeves 42 welded or otherwise secured to an upper frame 43 erected upon the main frame 23.

The shafts 41 (see also Fig. 7) are driven in opposite directions so that the inner spans of the belts 36 move up the frame 23 together, by a pair of drive sprockets 44 secured on their upper ends and engaged with a main drive chain 45. The drive chain 45 is also engaged with adjacent pairs of main drive shafts 41a, 41b, 41c, etc., of adjacent harvesters 20a, 20b, 20c, etc. The drive chain 45 is in mesh with an idler sprocket 46 journalled at the outer side of the outermost one of the harvesters 20 and with a drive sprocket 47 mounted upon the output shaft of a right angle gear box 48 supported upon the inner side of the innermost one of the harvesters 20. An input shaft 49 of the gear box 48 carries a pulley 50 driven by a belt 51 from a drive pulley 52 on the tractor power take-off generally indicated at 53. By the power transmission just described all of the harvesters 20 are driven simultaneously from the tractor engine. The drive chain 45 passes around the several sprockets 44 being entwined therethrough in order to drive the shafts of each pair 41, 41a, 41b, 41c, etc., in opposite directions.

The pulleys 37 (Figs. 3 and 6) which are engaged with the belts 36 at the lower (right) end of the frame 23 are mounted for translatory movement in order to tighten the belts 36. The two pins 38 extend upwardly through slots 54 cut in the top and bottom horizontal spans of the box girders 24 and 25. Each of the pins 38 also extends through a hole 55 in the horizontal web of a sliding angle iron 56 and through a washer 57 partially spanning the slot 54. The angle iron 56 is welded or otherwise secured on the forward end of an adjustment bolt 58 the rear end of which extends through an ear 59 welded on the outer side of the girder 24 or 25 and adjustably positioned therein by a pair of adjustment nuts 60. By the mechanism just described the pulleys 37 may be slid along their slots 54 to tighten the two lift belts 36.

As the harvester 20 moves along the ground the guides 35 sweep the vegetable leaves up and together, guiding them into the nip between the inner upwardly moving spans of the belts 36. The leaves of the vegetables are pinched between the two belts 36 as shown in Fig. 6 and the earth breaker 33 loosens the earth so that the vegetables are serially lifted from the earth and carried up the inclined path determined by the guided path of movement of the inner spans of the belts 36. Each of the vegetables is spaced from its preceding and following neighbors the same distance as when it was growing in the ground so that a series of spaced vegetables constantly moves up the pathway determined by the lifting belts 36.

Near the upper ends of the girders 24 and 25 the inner spans of the lifting belts 36 pass over the front edge of a guide plate 61 which is supported by studs 62 beneath the frame 23. The plate 61 diverges angularly from the girders 24 and 25 making up the frame 23 and is so spaced beneath the inner span of the belts 36 that a vegetable supported by its leaves and stems from the belts 36 is at such level that its stems enter a longitudinal slot 63 cut in the plate 61 in line with the inner spans of the belts 36. The right or lower end of the plate 61 has a notch 64 leading to the slot 63 so that the stems of vegetables hanging slightly out of line will be guided into the slot 63.

A stub shaft 65 is mounted near the front and at one side of the slot 63 and journals a sprocket 66 with which a chain 67 is engaged. The chain 67 is also engaged with a drive sprocket 68 mounted near the lower end of a topping mechanism drive shaft 69. The drive shaft 69 (Fig. 2) is suitably journalled in the frame 23 and frame 43 and driven by a drive belt 70 (see also Fig. 7) running in a pulley 71 on the upper end of the shaft 69, an idler pulley 72 and a drive pulley 73 that is pinned or otherwise secured on the shaft 41 just below its drive sprocket 44. The relative sizes of the pulleys 73 and 71 as compared to the size of the drive pulleys 39 for the belts 36 is such that the chain 66 is driven at a lineal speed in excess of the lineal speed at which the inner spans of the belts 36 are driven.

Each link of the chain 67 has an outwarly protruding finger 74 which travels around the outside of the path determined by the chain so that each of the series of fingers moves across the longitudinal slot 63 at its open lower end and extends across the slot 63 into a stem engaging position. As can best be seen by reference to Fig. 4, one of the fingers 74 designated at 74a, is about to be moved in behind stems designated by the reference number 75 which have just entered the slot 63.

The fingers 74 move along the slot 63 into engagement with respective ones of the stems of the vegetables and, due to their greater lineal speed, assert a snubbing action on the stems which gently pulls the vegetable bodies upwardly against the underside of the plate 61. This snubbing action gradually increases as the particular vegetable moves along the slot 63 because that one of the fingers 74 with which its stems are engaged moves faster than the portion of the spans of the belt 36 between which its leaves are engaged. The relative movement can be seen by comparing the positions of the vegetable bodies, their stems and their leaves generally indicated by the reference numbers 76 and 77 in Fig. 5.

As can best be seen in Fig. 3, near the beginning of the slot 63 and the plate 61 a pair of idler pulleys indicated at 78 back up the inner spans of the belts 36 whereas near the end of the plate 61 only one idler pulley 79 backs up only one of the inner spans of the belts 36. This relieves the tension with which the belts 36 pinch the leaves as the respective vegetables move along the slot 63 and are snubbed upwardly against the undersurface of the plate 61. By relieving the tension with which the leaves are grasped they may be pulled downwardly from between the belts 36 by the snubbing action of the stems of the vegetables around that one of the fingers 74 with which they are engaged. As a result, the bodies of the vegetables are only gently pulled against the undersurface of the plate 61 with insufficient force either to damage them by forcing them upwardly into the slot 63, to pull their stems out of their bodies or to create sufficient friction to rub off the delicate skins against the undersurface of the plate 61.

A sprocket 80 is keyed on the lower end of the shaft 69 beneath the plate 61 and, in the embodiment shown, carries a snugly fitting six-link chain 81 into every pivot pin of which is mounted a backwardly swept knife 82. As the shaft 69 rotates the sprocket 80 also turns, rotating the chain 81 and sweeping the knives successively over the undersurface of the plate 61 and transversely across the slot 63 to sever the stems form the bodies of the vegetables along a line closely adjacent the vegetable bodies and separated therefrom by only the thickness of that one of the knives 82 making the cut. Because of the snubbing and gentle pressure created by the cooperation of the more rapidly moving fingers 74 and the gradually loosening belts 36, all of the vegetable bodies are snubbed against the undersurface of the plate 61 when they approach the end of the slot 63 and the path of movement of the severing knives 82. It will be observed that the slot 63 ends at a position within the cutting area of the knives 82 so that the stems are sharply sheared between the edges of the knives 82 sweeping the plate 61, and the end of the slot 63.

A guard plate 83 is supported above the plate 61 by a bracket 84 depending from the frame 23 to prevent any portions of the stems or leaves of the vegetables from falling downwardly into the space beneath the plate 61. The leaves, though relatively loosely grasped by the time the vegetables reach the cutting knives, are more tightly grasped again between the inner spans of the belts 36 as the belts 36 continue to move upwardly and finally are ejected from between the belts 36 at the rear (left) end of the harvester where the belts turn around the drive pulleys 39.

All of the individual harvesters 20 are supported by the main post 21 (see Fig. 2) which extends laterally from suitable brackets in the side of the tractor 22. Each of the harvesters 20 is mounted upon the post 21 by a pair of clamps 85 tightened around the post 21 and each having an ear 86 engaged with a horizontal stud 87 protruding laterally from a side frame member of the upper frame 43. The post 21 is supported, in part, by a guy 88 tied by a hook 89 (Fig. 1) to the tractor body.

A secondary framework comprising a supported rod 90 (Fig. 2) that is mounted by a bracket 91 near the front side of the tractor 22 and angle irons 92 and 93, carries a vegetable conveyor mechanism generally indicated at 94 and harvester lifting means now to be described. Each of the individual harvesters 20 may be lifted from its operative position shown in the drawings to an upper position where its wheels 26 are lifted off the ground, by a lift control mounted on the side of the tractor 22 and generally indicated by the reference 95 in Fig. 2.

The rod 90 is rotatably mounted in a plurality of short, axialy aligned tubes 96 which are welded or otherwise secured on the upper edge of a horizontal cross frame member 97, extending lateraly from the bracket 91 on the tractor 22. An arm 98 welded or otherwise secured on the inner end of the rod 90 is connected by a tie rod 99 to the lift control 95. Several crank arms 100 are also welded or otherwise secured to the rod 90 and extend forwardly jointly supporting a lifter bar 101 (see also Fig. 1). When the lift control 95 is swung backwardly, the bell crank comprising the arm 98, arms 100, and lifter bar 101 rocks in a counterclockwise direction. Each individual harvester 20 is linked to the lifter bar 101 by a lifter rod 102 bolted to an angle iron 103 extending between the posts 29 on the girders 24 and 25 (see also Fig. 9).

Each of the lift rods 102 extends through a vertical hole in the lifter bar 101 and through a coil spring 104 which surrounds the rod 102 and is compressed between the upper surface of the bar 101 and a threaded collar 105 fixed on the rod 102.

The lift control thus serves both to lift the harvesters from their operative position, pivoting them on the studs 87 in the clamp ears 86 and also to resiliently support part of the weight of the harvesters giving them a "floating" action with their level above ground determined by their ground engaging wheels.

The subsidiary frame comprising the angle irons 92 and 93 supports the conveyor mechanism 94. The conveyor mechanism 94 comprises a horizontal conveyor 106 (Figs. 2 and 8) which runs on an idler drum 107 at the outboard side of a conveyor trough 108 and upon an inboard drum 109. The conveyor 106 runs horizontally across beneath the topping mechanisms of the individual harvesters in line to receive the severed crop bodies as they fall from the severing knives 82. The conveyor 106 extends beneath the body of the tractor 22 and is upwardly inclined at its far end, being guided in its path by suitable edge guide shoes 110. The conveyor 106 is driven by a belt 111 engaged with the tractor power take-off 53 and the drive pulley on the shaft of the drive drum 109. The raised upper end of the conveyor 107 discharges the crop into the lower end of a cleated elevator generally indicated at 112. The elevator 112 is supported from the tractor by support links 113 and extends upwardly and to one side of the tractor far enough so that its upper end can discharge the crop bodies into suitable receptacles such as baskets 114 carried on a truck or wagon body 115 (Fig. 1). The elevator 112 is driven by a belt 116 also engaged on the shaft of the conveyor drum 109.

I claim:

1. A harvester for a row-grown crop each vegetable of which has a body grown beneath ground level, stems extending upwardly therefrom and leaves above ground level, said harvester comprising, in combination, an elongated frame, a pair of upwardly inclined endless belts mounted upon parallel shafts journalled on said frame and so spaced that the inner spans of said belts are closely adjacent each other, means for driving said belts with their inner spans moving upwardly together at a constant linear speed, means at the lower forward end of said frame for successively removing the bodies from the ground and for guiding the leaves into the nip between the inner spans of said belts, a guide plate mounted on said frame near the upper end of said belts and extending therebeneath, said guide plate having a slot longitudinally aligned with the inner span of said belts and being spaced beneath said belts at its forward end a distance such that the bodies depending from the leaves engaged between said belts are guided beneath said plate and the stems enter and move along said slot as the vegetables are carried along by said belts, at least one continuous chain mounted on said frame with its span extending parallel to and along said slot, spaced individual stem engaging means mounted on said chain for movement therewith above and along the slot in said plate and each engageable behind and with the stems of an individual vegetable, mechanism operatively associated with said stem engaging means for driving said stem engaging means at a lineal speed higher than the lineal speed of said belts whereby the stems are advanced relative to the leaves thereof and the body is snubbed upwardly against the undersurface of said plate, and knife means movable slidingly along the surface of said plate and generally transversely across the slot in said plate for severing the stems.

2. In a harvester for a row-grown crop each vegetable of which has a body located beneath ground level, stems extending upwardly therefrom and leaves above ground level, said harvester having an elongated frame, a pair of upwardly inclined belts, means for mounting and driving said belts with their inner spans adjacent and moving upwardly together at a constant speed and means for digging and guiding the leaves of crops into the nip between said belts, the improvement comprising, a guide plate mounted on said frame at a level beneath said belts and near their upper ends, said plate having a longitudinal slot aligned with the inner span of said bolts and extending rearwardly from a point such that the bodies of crops suspended from said belts by their leaves are beneath said plate and the stems connecting the bodies and the leaves enter and move along in said slot as the vegetables are carried along by said belts, at least one continuous chain mounted on said frame with its span extending parallel to and along said slot, a series of spaced individual stem engaging fingers mounted on said chain for movement therewith along said slot above said plate at a lineal speed in excess of the lineal speed of said belts and each engageable behind and with the stems of an individual vegetable for advancing the stems relative to the leaves and lifting the body against the undersurface of said plate, and knives mounted for sweeping movement over the surface of said plate and across said slot for severing the stems adjacent to the bodies.

3. Topping mechanism for a row-crop harvester having continuous means for grasping vegetables by their leaves and feeding the vegetables along an upwardly inclined lineal path, said topping mechanism comprising, a generally horizontal plate having a longitudinal slot therein, said plate being mounted beneath said path with the slot therein in line with such path and spaced from said continuous means such distance that as the vegetables move along the path, the stems of the vegetables extend through and move along the slot and the bodies of the vegetables move below said plate, at least one continuous chain mounted on said frame with its span extending parallel to and along said slot, spaced individual fingers mounted on said chain for movement therewith along a path parallel to and just above the slot and engageable with the stems of the vegetables, mechanism operatively associated with said stem engaging means for moving said fingers along their path at a lineal rate in excess of the rate of movement of the leaf grasping means for advancing the stems of each vegetable relative to its leaves whereby each vegetable body is snubbed upwardy against the underside of said plate as it moves along the slot, and at least one knife mounted for movement along the surface of said plate and across the slot for severing the vegetable bodies from their stems.

4. Topping mechanism for a row-crop harvester comprising a generally horizontal plate having a longitudinal slot therein, mechanism for grasping vegetables by their leaves with the bodies depending therefrom by the stems and for moving the vegetables along an inclined path vertically and longitudinally aligned with the slot in said plate with the stems of the vegetables extending through and moving along the path and the bodies being located and carried along beneath said plate, a plurality of spaced, individual fingers each movable across the slot into engagement behind the stems of individual vegetables and along the slot at a higher lineal rate than the lineal rate of said vegetable leaf grasping and feeding mechanism for advancing the stems of each vegetable relative to the leaves thereof and snubbing the bodies thereof against the lower side of said plate, and a plurality of spaced knives mounted for movement along the undersurface of said plate across the slot for severing the vegetable stems.

5. In a row-crop harvesting machine having upwardly inclined conveyor means for lifting and feeding vegetables by grasping the leaves thereof with the bodies dependingly supported by the stems connecting the leaves and bodies and having a stem severing knife located in a plane beneath and diverging from the path of movement of the vegetables in said conveyor, the improvement consisting of, a generally horizontal guide plate having a slot aligned with said conveyor for guiding the stems of vegetables to said knife and with the under side of said plate lying closely adjacent the plane of the knife, at least one continuous chain mounted on said frame with its span extending parallel to and along said slot, spaced finger means mounted on said chain movable therewith along and above the slot in said plate into engagement behind the stems of the vegetables, and mechanism operatively associated with said stem engaging means for moving said finger means at a lineal rate faster than the rate of movement of the leave grasping conveyor, whereby the acceleration of the stems relative to the leaves draws the bodies upwardly into contact with the undersurface of said plate and closely adjacent the plane of said knife.

References Cited in the file of this patent

UNITED STATES PATENTS 2,197,225    Pierson                Apr. 16, 1940